United States Patent [19]

de Sartre

[11] Patent Number: 4,694,386

[45] Date of Patent: Sep. 15, 1987

[54] CHOPPED POWER SUPPLY CONTROL CIRCUIT WITH AUTOMATIC START-UP

[75] Inventor: Jean de Sartre, Meylan, France

[73] Assignee: Thomson-CSF, Paris, France

[21] Appl. No.: 827,147

[22] Filed: Feb. 7, 1986

[30] Foreign Application Priority Data

Feb. 8, 1985 [FR] France ............................ 85 01823

[51] Int. Cl.$^4$ ........................................... H02P 13/22
[52] U.S. Cl. ...................................... 363/49; 363/97; 323/901
[58] Field of Search .................................. 363/20–21, 363/49, 56, 97, 131; 323/901, 908

[56] References Cited

U.S. PATENT DOCUMENTS

| | | | |
|---|---|---|---|
| 3,733,540 | 2/1972 | Hawkins | 363/89 |
| 3,879,647 | 4/1975 | Hamilton et al. | 363/49 X |
| 4,063,307 | 12/1977 | Stephens | 363/56 X |
| 4,195,335 | 2/1980 | Murakami | 363/49 |
| 4,272,805 | 6/1981 | Iguchi et al. | 363/49 X |
| 4,330,816 | 5/1982 | Imazeki et al. | 363/21 X |
| 4,400,767 | 8/1983 | Fenter | 363/21 |

FOREIGN PATENT DOCUMENTS 0144754 11/1984 European Pat. Off. .

OTHER PUBLICATIONS

E.D.N. Electrical Design News, vol. 29, No. 18, Sep. 1984, pp. 213–220, Boston, U.S.; G. Gattavari: "Design Custom Power Sources with Switching-Regulator Chip".

Primary Examiner—Peter S. Wong
Attorney, Agent, or Firm—Oblon, Fisher, Spivak, McClelland & Maier

[57] ABSTRACT

The invention provides an integrated chopped power supply control circuit intended to receive regulation control signals and to produce square waves for enabling a switch. It comprises automatic start up means producing, in the absence of regulation signals, bursts of start up attempts with a very low recurrence period. Each burst lasts about 10% of this period and is followed by a rest time.

7 Claims, 7 Drawing Figures

FIG_1

FIG_2

FIG_3

FIG_4

FIG_7

CHOPPED POWER SUPPLY CONTROL CIRCUIT WITH AUTOMATIC START-UP

BACKGROUND OF THE INVENTION

1. Field of the Invention

The present invention relates to stabilized power supplies called chopped power supplies.

A chopped power supply operates in the following way: a transformer primary winding receives a current which comes for example from a rectifier bridge receiving the power from the AC mains. The current in the transformer is chopped by a switch (for example a power transistor) placed in series with the primary winding.

A circuit controlling the transistor establishes periodic square waves for enabling the transistor. For the duration of the square wave the current is allowed to pass; outside the square wave, the passage of the current is prevented.

On one (or more) secondary windings of the transformer an AC voltage is then collected. This voltage is rectified and filtered so as to obtain a DC voltage which is the DC output voltage of the chopped power supply.

To stabilize the value of this DC voltage, the cyclic periodic conduction ratio of the switch is adjusted, that is to say the ratio between the conduction time and the disablement time in a chopping period.

2. Discussion of Background

Figure 1:
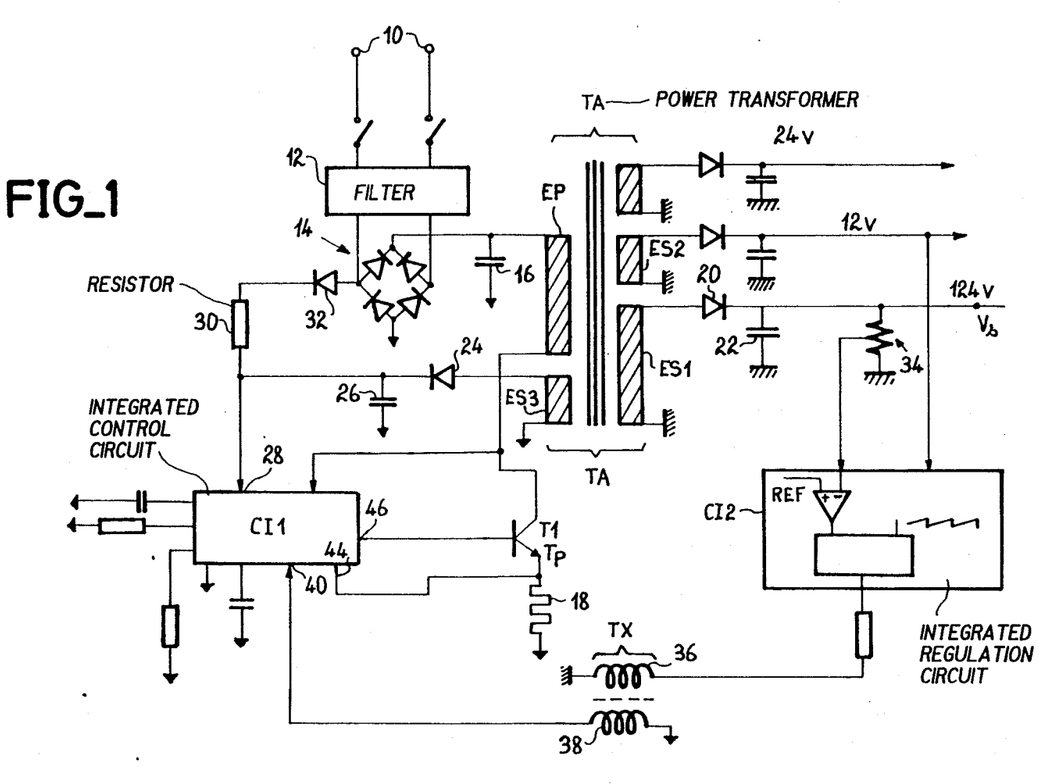
FIG. 1 shows a general chopped power supply diagram using two integrated circuits placed respectively on the primary side and on the secondary side of a transformer.

In a chopped power supply architecture proposed by the applicant and shown in FIG. 1, two integrated circuits are used. One of the circuits, CI1, serves for controlling the base of a power transistor $T_p$ for applying thereto periodic enabling and disabling control signals. The space control circuit CI1 is placed on the primary winding side (EP) of the transformer (TA) for reasons which will be better understood further on in the description. The integrated circuit, regulation circuit CI2, is on the contary placed on the secondary side (winding ES1) and its serves for examining the output voltage Vs of the power supply for elaborating regulation signals which it transmits to the first integrated circuit through a small transformer TX. The first integrated circuit CI1 uses these regulation signals for modifying the cyclic conduction ratio of the switching transistor TP and thus for regulating the output voltage Vs of the power supply.

We will come back in more detail hereafter to the circuit shown in FIG. 1.

Numerous problems arise during designing of a chopped power supply, and the problems with which we will be particularly concerned here are problems of starting up the power supply and problems of safety should over voltages or over currents occur at different points in the circuit. The first problem which is met with is that of starting up the power supply : on switching on, the regulation circuit CI2 will tend to cause the base control circuit CI1 to generate square waves of maximum cyclic ratio until the power supply has reached its nominal output voltage. This is all the more harmful since there is then a heavy current drain on the side of the secondary windings which are connected to initially discharged filtering capacitors. There is a risk of destruction of the power transistor through over-currents during the start-up phase.

Progressive start-up circuits have already been proposed which limit the duration of the enabling square waves during a start-up phase, on switching on the device; the U.S. Pat. No. 3,959,714 describes such a circuit in which charging of a capacitor from switch-on defines initially short square waves which gradually increase in duration until these square waves reach the duration which the regulation circuit normally assigns thereto. The short square waves have priority; but, since they become gradually longer during the start-up phase, after a certain time they cease to have priority; this time is defined by the charging time constant of the capacitor.

Another problem which arises is the risk of accidental overcurrents, or sometimes overvoltages which may occur in the circuit. These over-currents and over-voltages may cause damage and often result in the destruction of the power transistor if nothing is done to eliminate them. In particular, a short circuit at the output of the stabilized power supply rapidly destroys the power transistor. If the short circuit occurs on start-up of the power supply, it is not the gradual start-up system with short square waves which gradually increase which will allow the over-currents resulting from this short circuit to be efficiently accomodated.

Finally, another problem, particularly important in an architecture such as the one shown in FIG. 1, is the risk of disappearance of the regulation signals which should be emitted by the regulation circuit CI2 and received by the base control circuit CI1: these signals determine not only the width of the square waves for enabling the power transistor but also their periodicity; in other words, they serve for establishing the chopping frequency, possibly synchronized from a signal produced on the secondary side of the transformer. The disappearance of these signals causes a particular disturbance which must be taken into account.

Furthermore, the architecture of FIG. 1, in which the secondary circuits have been voluntarily separated galvanically from the primary circuits, is such that the base control circuit may function rapidly after switch on, as will be explained further on, whereas the regulation circuit CI2 can only function if the chopped power supply is in operation; consequently, at the beginning, the base control circuit CI1 does not receive any regulation signals and this difficulty must be taken into account.

SUMMARY OF THE INVENTION

In an attempt to resolve as well as possible the whole of these different problems which relate to safety against accidental disturbances in the operation of the power supply (initial start-up being able to be considered moreover as transitory disturbed operating phase), the present invention proposes an improved chopped power supply control circuit which accomplishes a function of gradual start-up of the power supply on switch-on and a function of passing to the safety mode should a malfunction occur such as a disappearance of appropriate regulation signals: the safety mode consists of a succession of very low frequency periodic cycles, each cycle consisting in a gradual start-up attempt during a first phase which is short compared with the period of the cycle and long compared with the chopping period of the chopped power supply, the first phase being followed by a pause at the end of the cycle, and periodic cycles succeeding each other until normal operation of the power supply is established or re-established; a very low frequency oscillator establishes these cycles when the power supply is not normal operating conditions (start up or malfunction); this oscillation is disabled when normal operation is ascertained; a high frequency oscillator generates a burst of chopping signals palliating the absence of regulation signals; these signals are transmitted solely during the first phase of each cycle; they are inhibited during the second phase.

According to a very important characteristic of the invention; gradual start-up operates not by limiting the duration of the square waves from the charging of a capacitor with a fixed time constant, but by limiting the current in the power transistor to a maximum value, this maximum value increasing gradually during the start-up phase, overshooting of this current value causing interruption of the power transistor.

Thus, even in the case of a quasi short circuit, the value of a current in the transistor is limited, which was not the case in gradual start-up circuits of the prior art.

More precisely, the chopped power supply control circuit, intended to receive periodic regulation control signals and to produce periodic square waves for enabling a main switch of the power supply, the square waves having a variable width depending on the regulation control signals; comprises:

a means for detecting the presence of regulation control signals, a very low frequency oscillator controlled by the detection means, this oscillator establishing, in the case of absence of regulation signals, a succession of very low frequency periodic cycles, the oscillator being inhibited by the detection means when regulation control signals are present, a high frequency oscillator producing chopping signals palliating the absence of regulation signals for producing enabling square waves, an inhibition means only allowing chopping signals to be transmitted to the switch during a first phase of each very low frequency periodic cycle and for preventing such transmission during the rest of the cycle, the first phase of each cycle having a duration which is long compared with the period of the high frequency oscillator and short compared with the period of the very low frequency oscillator.

Preferably, the high frequency oscillator has a free oscillation period slightly greater than the period of the regulation control signals and it is synchronized by these signals when they are present.

The regulation control signals may comprise a positive pulse followed by a negative pulse, one of them serving for synchronizing the high frequency oscillator, the positive pulse being transmitted through the inhibition means to a set input of a flip flop for enabling the switch, whereas the negative pulse is transmitted to the reset input of this flip flop for disabling.

In so far as limiting the current to a gradually increasing value during the start-up cycles is concerned, a threshold comparator (92) is preferably provided receiving a signal for measuring the current in the switch in order to generate a signal for disabling the switch should the threshold be exceeded and a means (90) for causing the threshold of the comparator to vary in the following way:

under normal operating conditions the threshold is fixed at a first value;

at the beginning of the first phase of each very low frequency periodic cycle, the threshold passes suddenly from the first value to a second value corresponding to a lower current in the switch;

during the first phase of each cycle the threshold passes gradually back from the second value to the first one.

BRIEF DESCRIPTION OF THE DRAWINGS

Other features and advantages of the invention will be clear from the following detailed description made with reference to the accompanying drawings in which.

DESCRIPTION OF THE PREFERRED EMBODIMENTS

Referring again to FIG. 1, which represents a chopped power supply architecture given by way of example illustrating the utility of the invention, the line of the public electric mains has been designated by the reference 10 (mains at 100 or 220 volts, 50 or 60 hertz). This line is connected through a filter 12 to the input of a rectifier bridge 14 whose output is connected on the one hand to a primary electric ground, shown throughout by a black triangle pointing downward and, on the other hand, to one end of the primary winding EP of the power transformer TA.

A filtering capacitor 16 is placed in parallel across the outputs of the rectifier bridge 14. The other end of the primary winding is connected to the collector of a switching transistor TP whose emitter is connected to the primary ground through a small current measuring resistor 18.

The transformer has several secondary windings which are preferably isolated galvanically from the mains and connected for exmaple to a secondary electric ground isolated galvanically from the primary ground.

Here, each of the secondary windings has one end connected to the secondary ground. The other end feeds a respective low pass filtering capacitor through a respective rectifier diode.

The description hereafter will refer to a single secondary winding ES1, connected by a diode 20 to a capacitor 22. The DC output voltage of the chopped power supply is the voltage Vs at the terminals of the capacitor 22; but of course other DC output voltages may be obtained at the terminals of the other filtering capacitors connected to secondary windings. These output voltages forms stabilized power supply voltages for user circuits not shown. By way of example, a secondary winding ES2 supplies a stabilized voltage of a few volts for the integrated regulation circuit CI2, which has already been discussed. It can be verified therefore in this connection that this circuit is not fed with power and cannot therefore deliver signals as long as the chopped power supply is not operating.

The same goes a priori for the integrated circuit CI1 controlling the base of the power transistor TP, which circuit is supplied with a stabilized voltage delivered from a secondary winding ES3, a diode 24 and a capacitor 26 (it will be noted in passing that this winding, although a secondary winding, is connected to the primary ground and not to the secondary ground, for the very simple reason that the integrated circuit CI1 is necessarily coupled galvanically to the primary).

However, since start-up of the chopped power supply must be ensured, it is provided for the power supply terminal 28 of the integrated circuit CI1 to be also connected directly to the mains through a high resistor 30 and a diode 32; this is possible since the integrated circuit CI1 is connected to the primary gorund; this is not possible for the integrated circuit CI2 which must remain galvanically isolated from the mains. As soon as the chopped power supply is operating normally, the stabilized DC voltage delivered by winding ES3 and diode 24 take precedence over the voltage from the mains and diode 32; this diode 32 is disabled and the direct supply from the mains no longer occurs after the initial start-up phase.

The role of integrated circuits CI1 and CI2 will now be described.

The regulation circuit CI2 receives, from a divider bridge 34 placed at the terminals of the capacitor 22 that is to say at the output of the stabilized power supply, information concerning the value of the voltage to be stabilized Vs.

This information is compared with a reference value and applied to a pulse width modulator which produces periodic square waves of variable width depending on the value of the output voltage Vs; the lower Vs the wider the square waves.

The square waves are produced at the chopping frequency of the chopped power supply. This frequency is therefore established on the secondary side of the circuit; it is generated either inside circuit CI2, or outside in a circuit not shown, in the form of a saw tooth voltage at the chosen chopping frequency. This saw tooth voltage is used in a way known per se for obtaining width modulation.

The variable width square waves, at the chopping frequency, are applied to a primary winding 36 of a small transformer TX whose secondary winding 38, isolated galvanically from the primary, delivers positive and negative pulses at the rising and falling fronts respectively of the variable width square waves.

It is these pulses, whose position and frequency are determined by the regulation circuit CI2, which form regulation signals applied to an input 40 of the base control circuit CI1.

Transformer TX is formed by a few turns wound on a ferrite rod, the turns of the primary and the turns of the secondary being sufficiently spaced apart from each other for complying with the standards of galvanic isolation between primary circuits and secondary circuits in the chopped power supply.

The integrated base control circuit CI1 comprises different inputs among which have already been mentioned a power supply input 28 and a regulation signal input 40; a current measuring input 44 is connected to the current measuring resistor 18; an inhibition input monitors the magnetization condition of a transformer. Finally, inputs may be provided for connecting elements (resistors, capacitors) which should form part of the integrated circuit itself but which, for technological reasons (space) or for practical reasons (possiblities of adjustment by the user) are mounted on the outside.

The integrated circuit CI1 finally comprises an output 46 which is intended to be coupled by direct galvanic coupling to the base of the power transistor $T_p$.

This output delivers square waves for enabling and disabling the transistor $T_p$.

Figure 2:
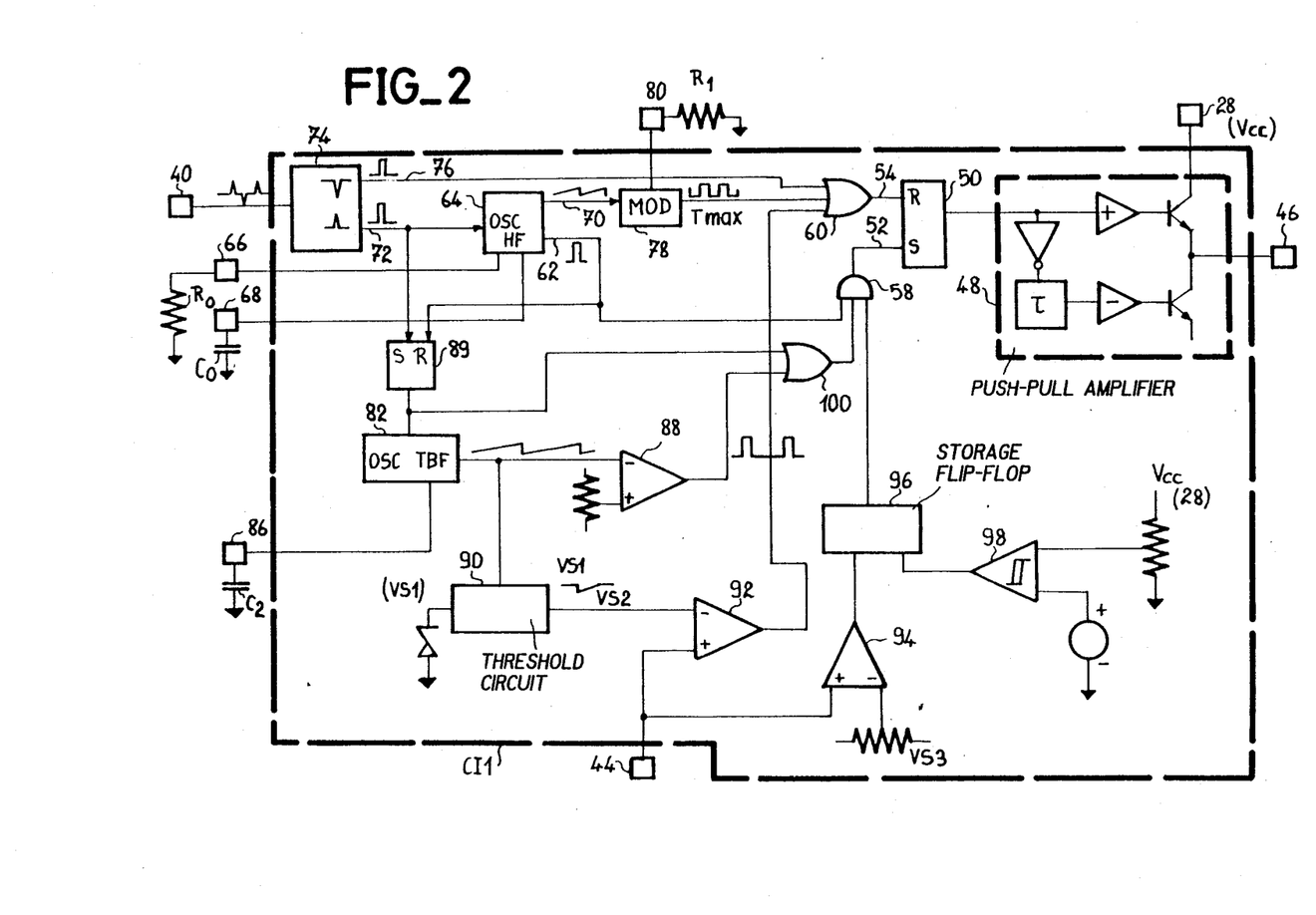
FIG. 2 shows a diagram of an integrated circuit for controlling the power transistor placed on the primary side.

FIG. 2 shows the general architecture of the integrated circuit CI1, limited to the elements which relate more particularly to the invention.

The output 46 of the circuit is the output of a push-pull amplification stage designated as a whole by the reference 48, this stage comprising preferably two separate amplifiers one of which receives enabling square waves and the other of which receives disabling signals formed by enabling square waves inverted and delayed by a few microseconds. Such amplifiers are now well known.

The enabling signals are delivered by a logic flip flop 50 having a set input 52 and a reset input 54. The set input causes the power transistor to be enabled. The reset input causes it to be disabled.

The set input 52 receives the pulses which pass through a logic AND gate 58, so that enabling only occurs if several conditions are simultaneously satisfied; one unsatisfied condition will be sufficient to inhibit enabling.

The reset input 54 receives the pulses which pass through a logic OR gate 60, so that disabling (after enabling) will occur as soon as a disabling signal is present at one of the inputs of this gate.

In the diagram of FIG. 2, the AND gate 58 has three inputs. One of these inputs receives periodic pulses from an output 62 of a high frequency oscillator 64; the other inputs serve for inhibiting the transmission of these pulses.

The oscillator defines the periodicity of the chopping of the power supply (20 kilohertz for example). Under normal operating conditions, the oscillator is synchronized by the regulation signals; under start-up conditions, it is self oscillating at a free frequency defined by the values of a resistor Ro and a capacitor $C_o$ external to the integrated circuit CI1 and connected respectively to an access terminal 66 and an access terminal 68. The free frequency fo is in theory slightly lower than the normal chopping frequency.

Oscillator 64 is a relaxation oscillator which produces at an output 70 a saw tooth whose zero return is caused by the appearance of a positive pulse arriving at terminal 40. This is why oscillator 64 is shown with one input connected to an output 72 of a separation and shaping circuit 74 which receives the regulation signals from terminal 40 and shapes them while separating the positive pulses from the negative pulses. The shaping circuit 74 has two outputs; 72 for the positive pulses, 76 for the negative pulses (the notation of positive pulses, negative pulse will be kept for distinguishing the enabling pulses and the disabling pulses even if the shaping circuit produces pulses of the same sign at both its outputs 72 and 76).

Oscillator 64 has two outputs: one output 70 delivering a saw tooth and one output 62 delivering a short pulse at the time of the zero return of the saw tooth.

A pulse width modulator 78 is connected on the one hand to the output 70 of the oscillator and on the other to a reference voltage adjustable by means of a resistor R1 external to the integrated circuit and connected to a terminal 80 giving access to the circuit. Modulator 78 delivers periodic square waves synchronized with the signals of the oscillator, these square waves defining a maximum conduction duration Tmax beyond which the power transistor must be disabled in any case for safety reasons. These square waves and modulator 78 are applied to an input of the OR gate 60. The duration Tmax is adjustable by means of the external resistor R1.

The elements which have just been described ensure the essential part of the operation under normal conditions of the integrated circuit CI1. The following elements are more specifically provided for controlling abnormal operation or start-up of the power supply.

A very low frequency oscillator 82 is connected to an external capacitor C2 through an access terminal 86. This external capacitor allows the very low frequency oscillation to be adjusted. The frequency may be 1 hertz for example.

Oscillator 82 is a relaxation oscillator delivering a saw tooth. This saw tooth is applied on the one hand to a threshold comparator 88 which causes periodic square waves to be produced synchronized with the very low frequency saw tooth of the oscillator. These square waves have a brief duration compared with the period of a saw tooth; this duration is fixed by the threshold of comparator 88; it may be for example be 10% of the period; it must be long compared with the free oscillation period of the high frequency oscillator 64 so that a burst of numerous pulses from the high frequency oscillator may be emitted and used during this 10% of the very low frequency period; this burst defines at start-up attempt during the first part of a start-up cycle; it is followed by a pause during the rest of the period, i.e. during the remaining 90%.

The oscillator only serves at start up; it is inhibited when regulation signals appear at terminal 40 and indicate that the chopped power supply is operating. This is why a control has been shown for inhibiting this oscillator, connected to the output 72 of the shaping circuit 74 through a flip flop 89. This flip flop switches under the action of the pulses appearing at the output 72. It is brought back to its initial state by the output 62 of oscillator 64 when there are no longer any pulses at output 71.

The saw teeth of the very low frequency oscillator are further transmitted to a circuit 90 producing a variable threshold whose purpose is to produce a threshold signal (current or voltage) having a first value Vs1 under normal operating conditions, and a threshold cyclically variable between a first value and a second value under start-up conditions. The method of varying this threshold will be described further on, but it may already be noted that the variation is driven by the very low frequency saw tooth.

The threshold signal produced by circuit 90 is applied to an input of a comparator 92 another input of which is connected to the terminal 44 already mentioned, for receiving at this input a signal representative of the amplitude of the current flowing through the power switch. The output of comparator 92 is applied to an input of the OR gate 60. It therefore acts for disabling the power transistor $T_p$, after it has been enabled, disabling occurring as soon as overshooting of the threshold (fixed or variable) defined by circuit 90 has been detected.

Another threshold comparator 94 has one input connected to the current measuring terminal 44 whereas another input receives a signal representing a third threshold value Vs3. The third value Vs3 corresponds to a current in the switch higher than the first value Vs1 defined by the circuit 90. The output of comparator 94 is connected through a storage flip flop 96 to an input of the AND gate 58 so that, if the current in the power switch exceeds the third threshold value Vs3, disabling of transistor $T_p$ is not caused (such disabling being caused by the comparator 92) but any new enabling of the transistor is inhibited. Such inhibition lasts until the flip flop 96 is switched back to its initial state corresponding to normal operation.

In theory, this resetting will only take place when the integrated circuit CI1 has ceased to be supplied normally with power and is again switched on. For example, resetting of flip flop 96 is caused through a hysteresis threshold comparator 98 which compares a fraction of the power supply voltage Vcc of the circuit (taken from terminal 28) with a reference value and which resets the flip flop when Vcc first passes above this reference after dropping below another reference value lower than the first one (hysteresis).

Finally, it may be stated that the output of the flip flop 89 (which detects the presence of regulation signals at terminal 40 therefore normal operation of the power supply), is connected to an input of an OR gate 100 which receives at another input the output of comparator 88 so that the output of comparator 88 ceases to inhibit enabling of transistor $T_p$ (inhibition during 90% of the very low frequency cycles) as soon as operation of the power supply has become normal.

OPERATION OF THE BASE CONTROL CIRCUIT

This operation will be described by illustrating it with voltage wave forms inside the chopped power supply and inside the integrated circuit CI1.

(a) Start-up on switching on

At the outset, the integrated circuit is not supplied with power at all.

The voltage at the power supply terminal 28 increases from 0 to a value Vaa which is not the nominal value Vcc but which is a lower value supplied by diode 32 and resistor 30 (cf. FIG. 1) as long as the chopped power supply does not deliver its nominal output voltage Vcc at terminal 28. Vaa is a voltage sufficient for ensuring practically normal operation of all the elements of the circuit CI1. Vaa is also sufficient for reinitializing the flip flop 96 which, as soon as that happens, no longer inhibits enabling of the power transistor $T_p$.

There are no regulation signals at the input 40. Consequently, the high frequency oscillator oscillates with its free frequency and the very low frequency oscillator also oscillates (it is not inhibited by the flip flop 89 since this latter does not receive any regulation signals from the output 72 of the shaper circuit 74).

The very low frequency oscillator 82 and comparator 88 define periodic cycles of start-up attempts repeated at a very low frequency.

Each cycle comprises a first part defined by the square waves of short duration at the output of comparator 88, and a second part formed by the end of the very low frequency period; the first part is an effective attempt at start-up. The second part is a pause if the effective attempt has failed. The pause lasts much longer than the effective attempt so as to limit power consumption.

During the first part of the cycle, the enabling signals delivered by the high frequency oscillator 64 are allowed to pass through the AND gate 58. They are then prevented from passing. Each pulse from the output 62 of the oscillator 64 enables the transistor $T_p$. There is therefore a burst of enabling pulses which is emitted for about 10% of the very low frequency period.

During start-up, the current intensities in the transistor tend to be very high. It is essentially comparator 92 which causes interruption of the conduction, after each enabling pulse delivered by oscillator 64, as soon as the current exceeds the threshold imposed by the variable threshold elaboration circuit 90. If comparator 92 does not cause enabling, modulator 78 will do so in any case at the end of the time Tmax.

The threshold elaboration circuit, which delivers to the comparator 90 a first fixed threshold value Vs1 under normal operating conditions (i.e. when the very low frequency oscillator 82 is disabled by the flip flop 89), delivers a variable threshold as a function of the saw tooth of the very low frequency oscillator in in the following way:

at the initial outset of a start-up attempt cycle (beginning of the saw tooth or zero return of the preceding saw tooth), the threshold passes suddenly from the first value Vs1 to a second value Vs2 corresponding to a lower current than the first value, then this threshold increases gradually (because driven by the very low frequency saw tooth) from the second value to the first. The growth time coincides preferably with the duration of a start-up attempt square wave (i.e. about 10% of the very low frequency period).

Then the threshold is stabilized at the first value Vs1 until the end of the period, but in any case if the circuit has not started up at that time, comparator 88 closes gate 58, through the OR gate 100 and inhibits any further enabling of the power transistor during the rest of the very low frequency period (90%). It is then the second part of the start-up attempt cycle which takes place: a pause during which the pulses of oscillator 64 are not transmitted through the AND gate 58.

Thus, the start-up cycles act from two points of view: on the one hand, a burst of enabling pulses is emitted (10% of the time) then stopped (90% of the time) until the next cycle; on the other hand, during this burst, the current limitation threshold passes gradually from its second relatively low value to its normal higher value.

Consequently, if the peak amplitude of the current in transistor $T_p$ is observed during the start-up bursts, it can be seen that in practice it increases linearly from the second value to the first. Thus gradual start-up is obtained by a much more efficient action than that which consists simply for example in causing the duration Tmax to increase from a low value to a nominal value.

If start-up is not successful, a new burst of enabling pulses is transmitted during the first part of the next cycle (it will be recalled that this cycle is repeated about once per second and that the burst may last 100 milliseconds).

If start-up is successful, regulation signals appear at terminal 40. These signals are shaped by circuit 74. They cause the very low frequency oscillator 82 to be stopped by the flip flop 89 which prevents the zero return of the saw tooth. Furthermore, flip flop 89 sends through the OR gate 100 a signal for cancelling out the inhibition effect imposed by the comparator 88. Finally, as soon as start-up is successful, the regulation signals cause the high frequency oscillator 64 to be synchronized.

Figure 3:
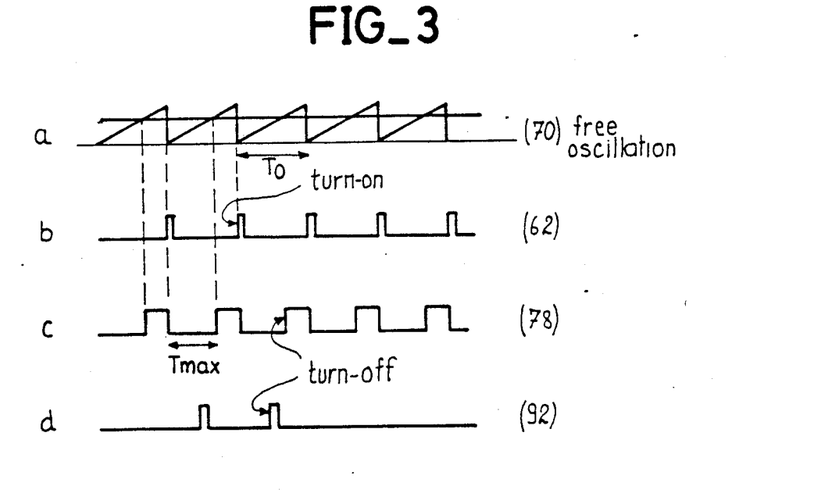
FIGS. 3 to 6 show timing diagrams of signals at different points of the circuit.

FIG. 3 illustrates the high frequency signals during the start-up period:

line a: saw tooth at the output 70 of the oscillator 64 (free oscillation at frequency fo, period To), line b: pulses for enabling the transistor $T_p$: these pulses coincide with the zero return of the saw tooth signal (output 62 of oscillator 64);

line c: output square waves from modulator 78 defining the maximum cyclic conduction time of the transistor, line d: pulses delivered comparator 92 when the current in the switch exceeds the threshold (gradually increasing during start up) defined by the circuit 90.

The conduction of transistor $T_p$, after being enabled by a pulse from line b, is stopped either by the square waves of line c if the current threshold is not exceeded, or by an output pulse from comparator 92.

Figure 4:
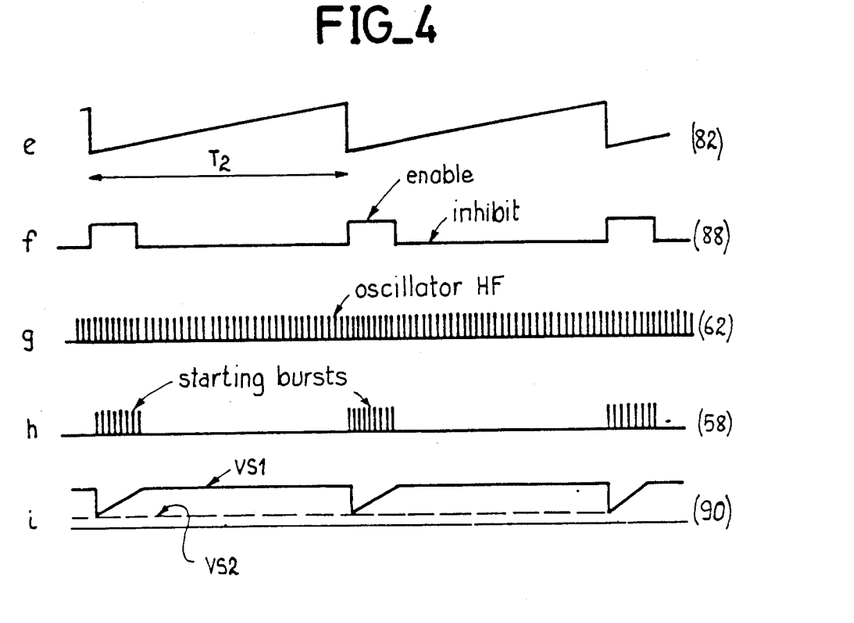

FIG. 4 shows the very lwo frequency signals during the start-up cycles. The diagrams are not to the same time scale as in FIG. 3 since it will be recalled that an example of the frequency of the high frequency oscillator 64 is 20 kilohertz whereas an example of the very low frequency of oscillator 82 is 1 hertz. The high frequency pulses have however been shown symbolically in FIG. 4, in number more limited than in reality for facilitating the representation.

line e: saw tooth output of the very low frequency oscillator (frequency f2, period T2), line f: output of comparator 88 showing the first phase (start-up attempt by allowing conduction of transistor $T_p$) and the second phase (pause by inhibiting the conduction of each very low frequency start up cycle, line g: pulses delivered by the freely oscillating high frequency oscillator, line h: bursts of enabling pulses at the output of the AND gate 58, line i: diagram of the cyclic variation of the threshold produced by circuit 90 during the start-up cycles: fixed value Vs1 in theory, sudden drop to Vs2 at the beginning of the very low frequency saw tooth, and gradual rise from Vs2 to Vs1, driven by the linear growth of the saw tooth, during the start-up burst.

(b) Operation of the power supply under normal established operating conditions

The very low frequency oscillator is not operating.

The high frequency oscillator is synchronized by the regulation signals.

The zero return of the high frequency saw tooth, coinciding with the positive pulses of the regulation signals, causes enabling of transistor $T_p$ (no inhbition by the AND gate 58 during normal operating conditions). The negative pulses cause disabling, through the OR gate 64, except if such disabling has been caused:

either by overshooting of the first current threshold value, detected by the comparator 92, or by the modulator 78 if the time interval between the positive pulse and the negative pulse which immediately follows it is greater than the maximum duration Tmax which is allowed.

Figure 5:
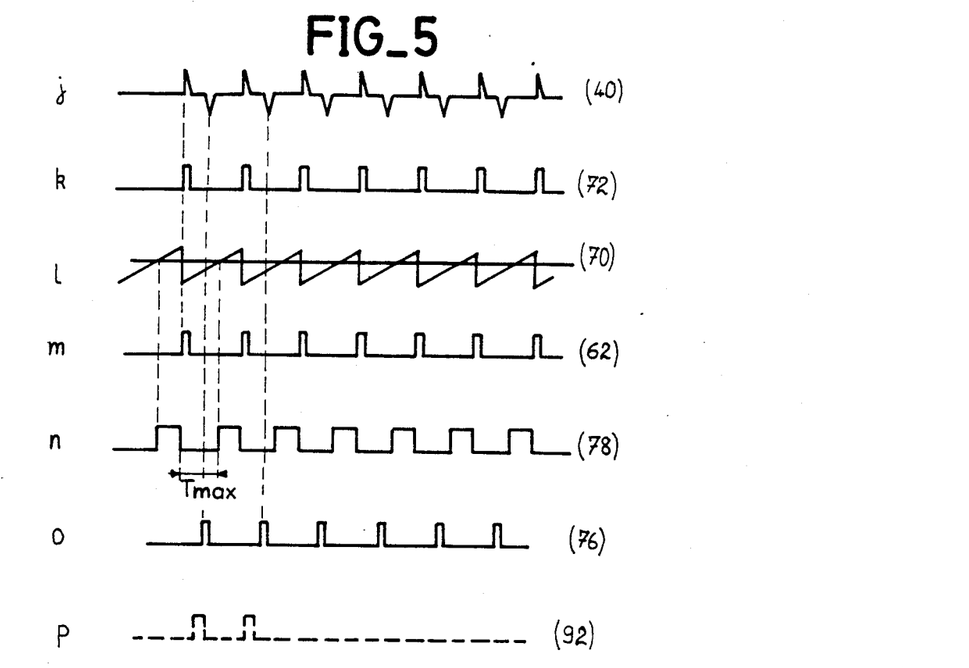

FIG. 5 shows the high frequency signals under normal operating conditions, line j: alternate positive and negative pulses received at the input 40 of the circuit (these are the regulation signals defining the times at the beginning and end of conduction of the power transistor $T_p$), line k: shaped pulses at the output 72 of the separation and shaping circuit 74: they correspond to the positive pulses only of the regulation signals, line l: saw tooth at the output 70 of oscillator 62; the saw tooth is synchronized with the regulation signals in that its zero return coincides with the pulses of line k, line m: pulses at output 62 of oscillator 64; these pulses are emitted during zero returns of the saw tooth of line l, line n: output square waves of modulator 78 further defining the maximum conduction time of the power transistor;

line o: pulses from the output 76 of the separation and shaping circuit 74: these pulses correspond to the negative pulses of the regulation signals, line p: as a reminder, pulses have been shown at the output of comparator 92 in the case where the current in the power transistor exceeds the threshold corresponding to Vs1.

The conduction of transistor $T_p$, after being enabled by a pulse of line k, is normally stopped by the pulse from line o which immediately follows it, or, more exceptionally by the pulses from line p if the threshold Vs1 is exceeded before the apearance of the pulse of line o, or else, by the square waves of line n if the threshold is not exceeded and if the pulse of line o appears after the beginning of a square wave of line n.

Figure 6:
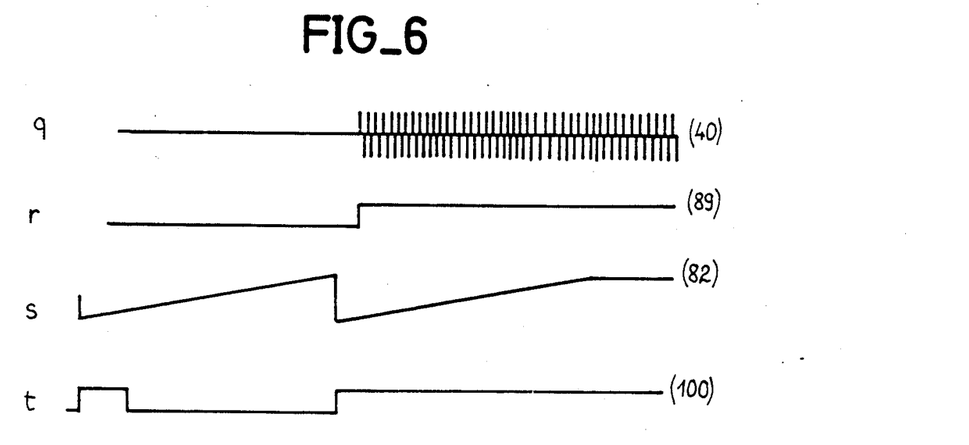

FIG. 6 shows the very low frequency signals at the time of passing over from start-up conditions to normal operating conditions (same scale as FIG. 4).

line q: regulation signals at the input 40; these signals are initially absent and appear at a certain moment, line r: output of the flip flop 89 indicating the absence then the presence of regulation signals, line s: very low frequency saw tooth which rises to its high level and does not drop again if the output o the flip flop 89 is at the high level (indicating the presence of regulation signals)

line t: output of the OR gate 100 showing initially a square wave of short duration, delivered by comparator 88 and causing a start-up burst (cf. FIG. 4), then blocking at the high level which prevents subsequent inhibition of the AND gate 58 by the comparator 88.

(c) Safety mode in the case of a malfunction

The safety mode consists in fact in establishing start-up cycles as during switch on.

These cycles are triggered by start up of the very low frequency oscillator 82 when the regulation signals disappear at input 40.

Flip flop 89 returns to an intial state when it no longer receives pulses from the output 72 of the separation and shaping circuit 74. Thus, oscillator 82 will be able to oscillate again and the above described cycles are established.

(d) Serious incident: very high over current

Whatever the operating conditions, normal or start-up, over-currents in transistor $T_p$ are detected by the comparator 92 and cause interruption of the conduction. But if there is for example a short circuit at the output of the power supply, an over-current may occur such that the current continues to increase before the conduction has time to be completely interrupted. In this case, it is provided for the threshold comparator 94 to deliver an order inhibiting the enabling when the current in transistor $T_p$ exceeds a third threshold value which is for example greater by 30% than the first value. This inhibition order is stored by flip flop 96 which switches under the action of the comparator and disables the AND gate 58; flip flop 96 can only come back to its initial state when the integrated circuit, after having partially or totally ceased to be supplied with power, is again normally supplied. For example, the power supply must be switched off and switched on again to allow pulses to pass again for enabling the transistor $T_p$.

Figure 7:
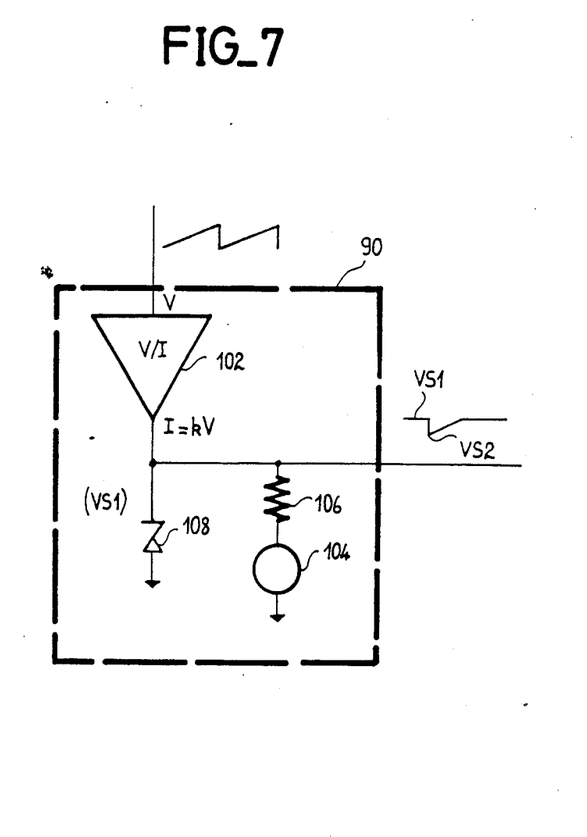
FIG. 7 shows a circuit detail for producing a variable threshold.

To finish this description, there has been shown in FIG. 7 one example of the circuit 90 which produces a variable threshold for the comparator 92: the very low frequency saw tooth deliveredy by the oscillator is applied to a voltage/current converter 102 which produces a saw tooth current increasing from 0 to a maximum value.

This current is applied to a series assembly of a voltage source 104 (value Vs2) and a resistor 106. A voltage clipper, represented by a Zener diode 108 (value of the conduction threshold: Vs1) is connected in parallel across the assembly 104, 106. The junction point between the output of the converter 102, resistor 106 and the voltage clipper 108 forms the output of circuit 90 and is connected to the input of comparator 92. Thus, when the saw tooth returns to zero, the output voltage of circuit 90 is Vs2. Then it increases as the current in the resistor 106 increases (linearly). When the voltage at the terminals of resistor 106 reaches and exceeds the value Vs1−Vs2, the voltage clipper conducts and diverts the current surplus so that the output voltage remains limited to Vs1.

What is claimed is:

1. A chopped power supply control circuit intended to receive periodic regulation control signals and to produce periodic square waves enabling a main switch of the power supply, the square waves having a variable width as a function of their regulation control signals, which circuit comprises:
   means for detecting the presence of regulation control signals,
   a very low frequency oscillator controlled by the detection means, this oscillator producing, in the absence of regulation signals, a succession of very low frequency periodic cycles, the oscillator being inhibited by the regulation control signal detection means,
   a high frequency oscillator producing chopping signals palliating the absence of regulation signals for producing enabling square waves,
   an inhibition means for allowing transmission of the chopping siganls to the switch only during a first phase of each very low frequency periodic cycle and for preventing such transmission during the rest of the cycle, the first phase of each cycle having a duration which is long compared with the period of the high frequency oscillator and short compared with the period of the very low frequency oscillator.

2. The control circuit as claimed in claim 1, wherein said high frequency oscillator has a free oscillation period slightly greater than the period of the regulation control signals and it is synchronized by these signals when they are present.

3. The control circuit as claimed in claim 1, wherein the regulation control signals comprise a positive pulse followed by a negative pulse, one of them being used for synchronizing the high frequency oscillator, the positive pulse being transmitted through the inhibition means to a set input of a flip flop for triggering off the beginning of conduction of the main switch, and the negative pulse being transmitted to a reset input of the flip flop for causing stopping of the conduction of the switch.

4. The control circuit according to claim 1 further comprising:
   a threshold comparator for receiving a signal measuring the current in said switch and for outputting a signal stopping the conduction of said switch when a threshold is exceeded;
   means for varying the threshold of said comparator including a means for producing a first threshold value during normal operation of said circuit, a means for producing a second threshold value at the beginning of said first phase of said very low frequency cycle, said second threshold corresponding to a current in said switch which is lower than during said normal operation, and a means for producing a gradually decreasing threshold during said first phase of said very low frequency cycle.

5. The control circuit as claimed in claim 4, wherein said very low frequency oscillator is a relaxation oscillator delivering a saw tooth signal and the means for varying the threshold is driven by the output of the very low frequency oscillator.

6. The control circuit as claimed in one of claims 4 and 5, wherein another threshold converter is provided receiving a signal of measurement of the current in the main switch and delivering a signal for complete inhibition of enabling of the switch when the current in the switch exceeds a third threshold value higher than the first value.

7. The control circuit as claimed in claim 6, wherein said inhibition signal delivered by the other comparator is cancelled out when the circuit, after having partially or totally ceased to be supplied with power, is again normally supplied.

* * * * *